United States Patent [19]

Ooi et al.

[11] Patent Number: 4,527,189
[45] Date of Patent: Jul. 2, 1985

[54] COLOR IMAGE PICKUP DEVICE

[75] Inventors: Kazushige Ooi, Sagamihara; Shigekazu Fujiwara, Kamakura; Nobuaki Yoshida, Tokyo; Yoshio Mori, Kawasaki, all of Japan

[73] Assignees: Tokyo Shibaura Denki Kabushiki Kaisha, Kawasaki; Nippon Kogaku K.K., Tokyo, both of Japan

[21] Appl. No.: 467,883

[22] Filed: Feb. 18, 1983

[30] Foreign Application Priority Data

Feb. 22, 1982 [JP] Japan .................. 57-26936

[51] Int. Cl.$^3$ .......................................... H04N 9/535
[52] U.S. Cl. .................................................. 358/29
[58] Field of Search ................ 358/29, 43, 44, 902

[56] References Cited

U.S. PATENT DOCUMENTS 4,249,197 2/1981 van Spaandark et al. ............ 358/29
4,355,325 10/1982 Nakamura et al. .................... 358/29
4,395,730 7/1983 Shen ....................................... 358/29

FOREIGN PATENT DOCUMENTS 2605018 11/1977 Fed. Rep. of Germany .

Primary Examiner—Richard Murray
Attorney, Agent, or Firm—Cushman, Darby & Cushman

[57] ABSTRACT

The invention provides a color image pickup device in which image light from a white object to be photographed or image light integrated by a diffusion plate or the like is incident on a pickup tube through an electrochromic element. Two primary color signals are separated from a video signal from the pickup tube, a voltage corresponding to a difference between the two primary color signals is detected by a differential amplifier, and the voltage is then applied across an electrochromic element. A spectral transmittance of which is then controlled, thereby achieving an optimal white balance.

7 Claims, 9 Drawing Figures

FIG. 2
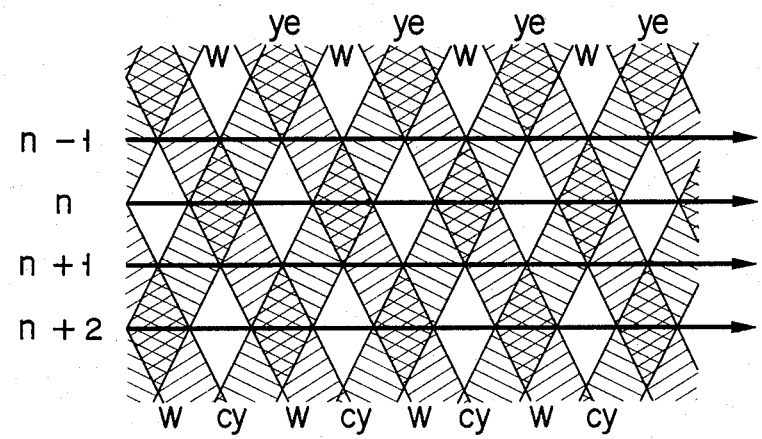
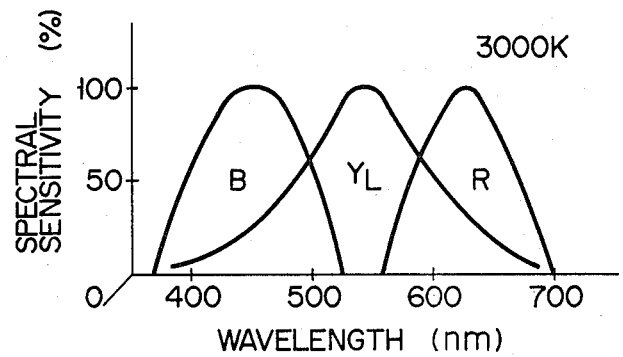
FIG. 3A
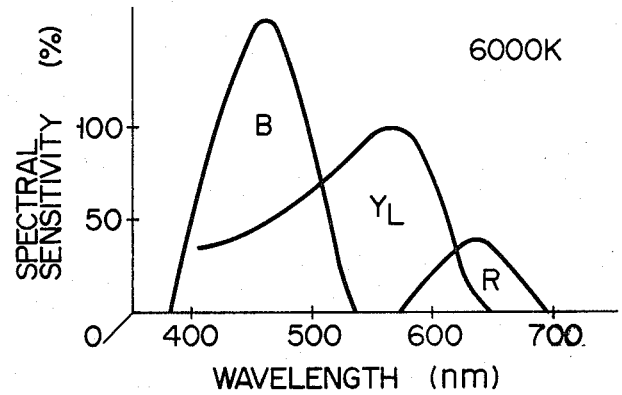
FIG. 3B

F I G. 5
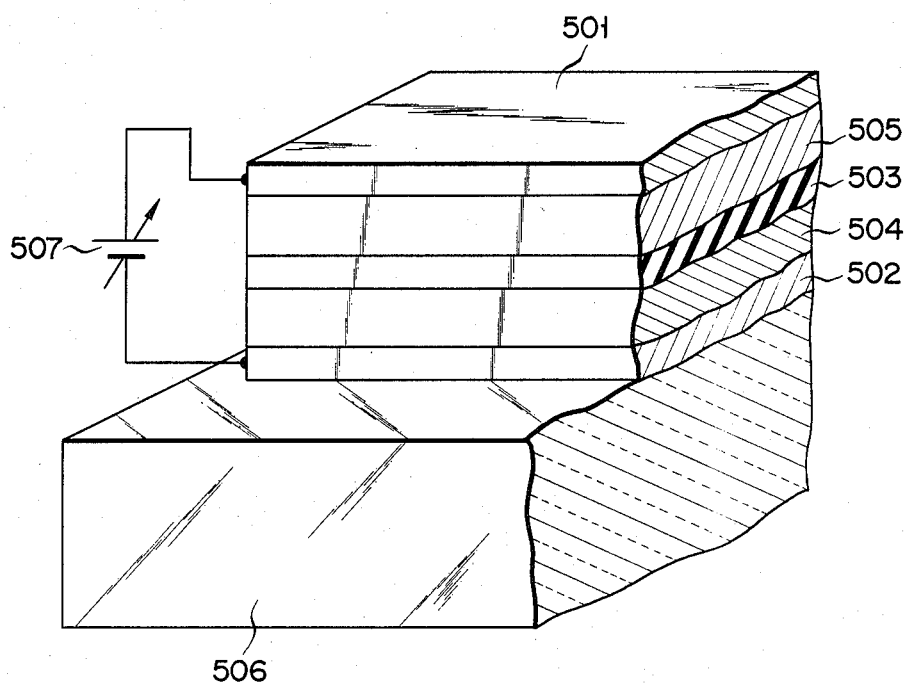

COLOR IMAGE PICKUP DEVICE

BACKGROUND OF THE INVENTION

The present invention relates to a color image pickup device such as a video camera.

In the color image pickup device such as a video camera, proper color reproduction cannot be performed unless a white balance is controlled at picture taking in accordance with the color temperature of the object to be photographed. Several methods have been proposed to control the white balance. FIG. 1 shows a typical system for controlling the white balance in a color video camera. Referring to FIG. 1, a lens 102 is focused on an object 101. Light from the object 101 passes through a trimming filter 103 through the lens 102, so that the image of an object is formed on an image pickup surface of a pickup tube 104. The pickup tube 104 comprises color stripe filters shown in FIG. 2. Reference symbol W denotes a transparent filter; G, a green filter; Ye, a yellow filter; and Cy, a cyan filter. The red and blue components of incident light are produced as an AM-modulated high-frequency signal from the stripe filters. This high-frequency signal is known as an interleave signal having a single carrier frequency. If the carrier frequency is 3.58 MHz, the interleave signal is amplified by a preamplifier 105 and is filtered by a band-pass filter 106 which has a frequency band of 3.58 MHz. The band-pass filter 106 then produces a chrominance signal. The chrominance signal is then delayed by a delay line 107 of $(1H-\pi/2)$. The delayed chrominance signal is then added to and subtracted from a non-delayed chrominance signal. An output from an adder 108 is detected by a detector 109. The band of the detected signal is then limited by a low-pass filter (LPF1) 110 which has a frequency band of 500 kHz. The low-frequency signal is then amplified by a voltage controlled amplifier (VCA) 111 which thus produces a red signal R. Similarly, an output from a subtractor 112 is detected by a detector 113. The band of the detected signal is limited by a low-pass filter (LPF1) 114, and the low-frequency signal from the low-pass filter 114 is then amplified by a voltage-controlled amplifier (VCA) 115 which produces a blue signal B. The voltage controlled amplifier is an amplifier which controls a gain in accordance with a voltage applied to the control end thereof. Meanwhile, the output from the preamplifier 105 is supplied to a low-pass filter (LPF1) 116 and a delay line (117), so that the output from the preamplifier 105 is converted into a low-frequency luminance signal $Y_L$ of the same frequency band and synchronous with the red and blue signals R and B. At the same time, the output from the preamplifier 105 passes through a low-pass filter (LPF2) 118 of 3.1 MHz and a delay line 119 and is supplied to an NTSC encoder 120. The NTSC encoder 120 produces a luminance signal Y which is synchronized with the red, blue and low-frequency luminance signals R, B and $Y_L$. The signals R, B and $Y_L$ are encoded by the NTSC encoder 120 and are produced as an NTSC signal 121.

Assume that the video camera is arranged such that the spectral characteristics of the pickup tube and the stripe filters are designed so as to provide a good balance of the color signal output under an illumination which has a color temperature of 3,000° K., as shown in FIG. 3A. When the user operates such a video camera under an illumination of 6,000° K. or in outdoors under direct sunlight, the output balance of the signals B, $Y_L$ and R changes, as shown in FIG. 3B. In order to balance the spectral sensitivities of the signals B, $Y_L$ and R, an amber filter as a trimming filter 103 is arranged on the optical path. Furthermore, a diffusion plate 122 is disposed on the optical path so as to uniformly illuminate the surface of the pickup tube with external light. An aperture of the lens is controlled such that the output from the pickup tube is kept normal, that is, a signal current is 0.2 $\mu A_{p-p}$ when a vidicon tube is used. However, the aperture may be controlled by an automatic diaphragm mechanism. In this case, an output from the VCA 111 corresponds to the red signal which has a given level relative to the white signal when the user just turns on the power switch of the camera. The given level is determined by a gain in accordance with the initial status of a voltage memory. This red signal is detected by a detector 128 and is smoothed by a smoothing circuit (LPF3) 129, thereby obtaining a DC voltage. The DC voltage is applied to one input end of a differential amplifier 130. The differential amplifier 130 compares the DC voltage from the smoothing circuit 129 and another voltage applied thereto, and produces a signal corresponding to a potential difference. The signal from the differential amplifier 130 is stored in a voltage memory 132 through an analog switch 131 which performs color temperature control. The blue signal is also processed in the same manner as the red signal. More particularly, the blue signal passes through a detector 123, a smoothing circuit 124 and a differential amplifier 125. The signal from the differential amplifier 125 is stored in a voltage memory 127 through an analog switch 126. Meanwhile, the low-frequency luminance signal $Y_L$ is detected by a detector 133 and is smoothed by a smoothing circuit 134. The smoothing circuit 134 thus produces a DC voltage. This DC voltage is applied to the other input end of each of the differential amplifiers 125 and 130. The differential amplifiers 125 and 130 thus compare input voltages, respectively. Here, note that the analog switches 126 and 131 are interlocked. When the switches 126 and 131 are simultaneously turned on, differential voltages corresponding to DC components $Y_L$ and R, and $Y_L$ and B are applied to the voltage memories 132 and 127, respectively. The contents of the voltage memories 132 and 127 are thus changed from the initial values. The red signal R and the blue signal B respectively from the VCAs 111 and 115 are changed so as to match with the low-frequency luminance signal $Y_L$. In other words, the gains of the VCAs 111 and 115 are changed, so that the differential voltages are eliminated, thus achieving a good white balance. Thereafter, the analog switches 126 and 131 are simultaneously released (OFF). Since the voltage memories 127 and 132 store the updated values of the differential amplifiers 125 and 130, respectively, the white balance is kept unchanged. The above operation of the white balance control requires a few seconds. Thereafter, the diffusion plate is removed from the optical path, and the light is incident on the pickup tube 104. When the color temperature of illumination during picture taking is changed, the analog switches are turned on and then off to obtain the proper white balance when a change in color temperature is small.

When a change in color temperature is great, another trimming filter must be used to achieve the optimal white balance. Assume that VCAs are used which have a wide change in the gain and a wide dynamic range. In this case, the optimal white balance can be obtained without using the trimming filter. Even if the amplitudes of the signals R, B and $Y_L$ are uniformly balanced, the S/N ratios between any two of these signals are not balanced. In the characteristics shown in FIG. 3, the S/N ratio of the red signal is degraded, thus degrading image quality. Furthermore, when the color temperature is changed, the spectral characteristics (sensitivity) of the low-frequency luminance signal $Y_L$ are changed, thus degrading the color reproduction except for the color temperature of 3,000° K. In order to compensate for such degradation in image quality, a linear matrix circuit must be used which is changed in accordance with a change in color temperature, resulting in the complex circuit arrangement and an increase in the number of component parts. Furthermore, stable circuit operation cannot be performed. The use of a trimming filter may allow the elimination of the above drawbacks. However, if a great number of filters are used in a turret manner, the structure becomes complicated and bulky. Further, since such a structure is of a mechanical type, it has poor resistance to impact and vibrations. The trimming filter has a movable member which is subject to deterioration over time in the optical path, so that the movable member of the trimming filter cannot be dust-proofed. Even if the trimming filter can be fitted in front of the lens, ease in handling and carrying is decreased.

SUMMARY OF THE INVENTION

It is an object of the present invention to provide a color image pickup device wherein light from a white object to be photographed or light integrated by a diffusion plate or the like is received through an electrochromic element, a video signal obtained by signal processing is applied to the electrochromic element to control a spectral transmittance thereof, thereby controlling a white balance, so that a color temperature of the light is converted to a designed color temperature without using a movable member so as to achieve an optimal white balance in a whole range of color temperature.

BRIEF DESCRIPTION OF THE DRAWINGS

FIG. 2 shows a schematic configuration of a color filter of a single tube camera;

FIG. 3A is a graph for explaining the spectral sensitivity of the output signal as a function of the wavelength when the color video camera designed for a color temperature of 3,000° K. is used under the illumination of 3,000° K. and FIG. 3B is a graph for explaining the spectral sensitivity of the output signal as a function of the wavelength when the same camera used in FIG. 3A is used under the illumination of 6,000° K.;

FIG. 5 is a partially sectional perspective view of an electrochromic element;

DETAILED DESCRIPTION OF THE PREFERRED EMBODIMENTS

Figure 1:
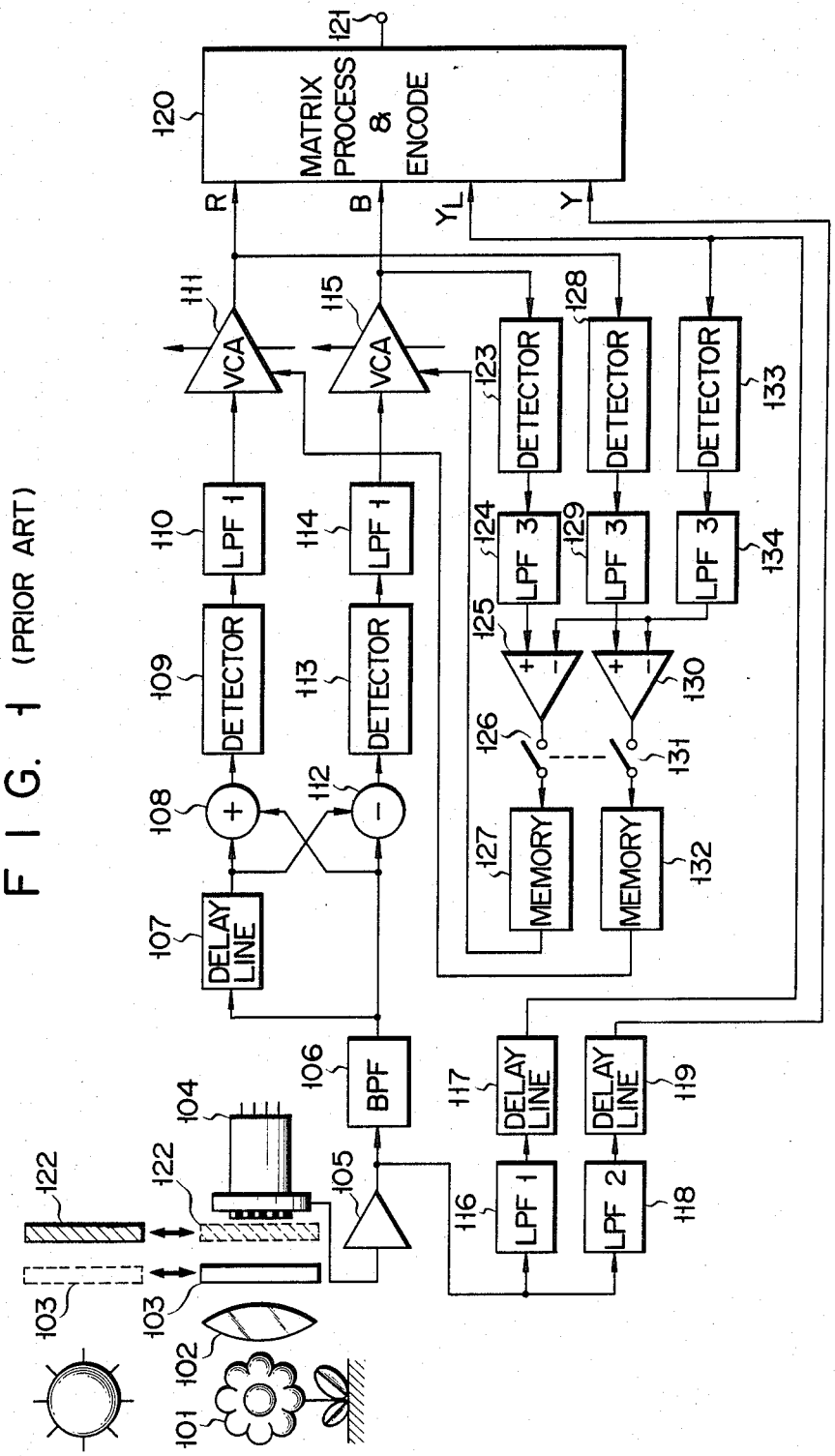
FIG. 1 is a block diagram showing the overall configuration of a conventional color image pickup device which uses a white balance method.
Figure 4:
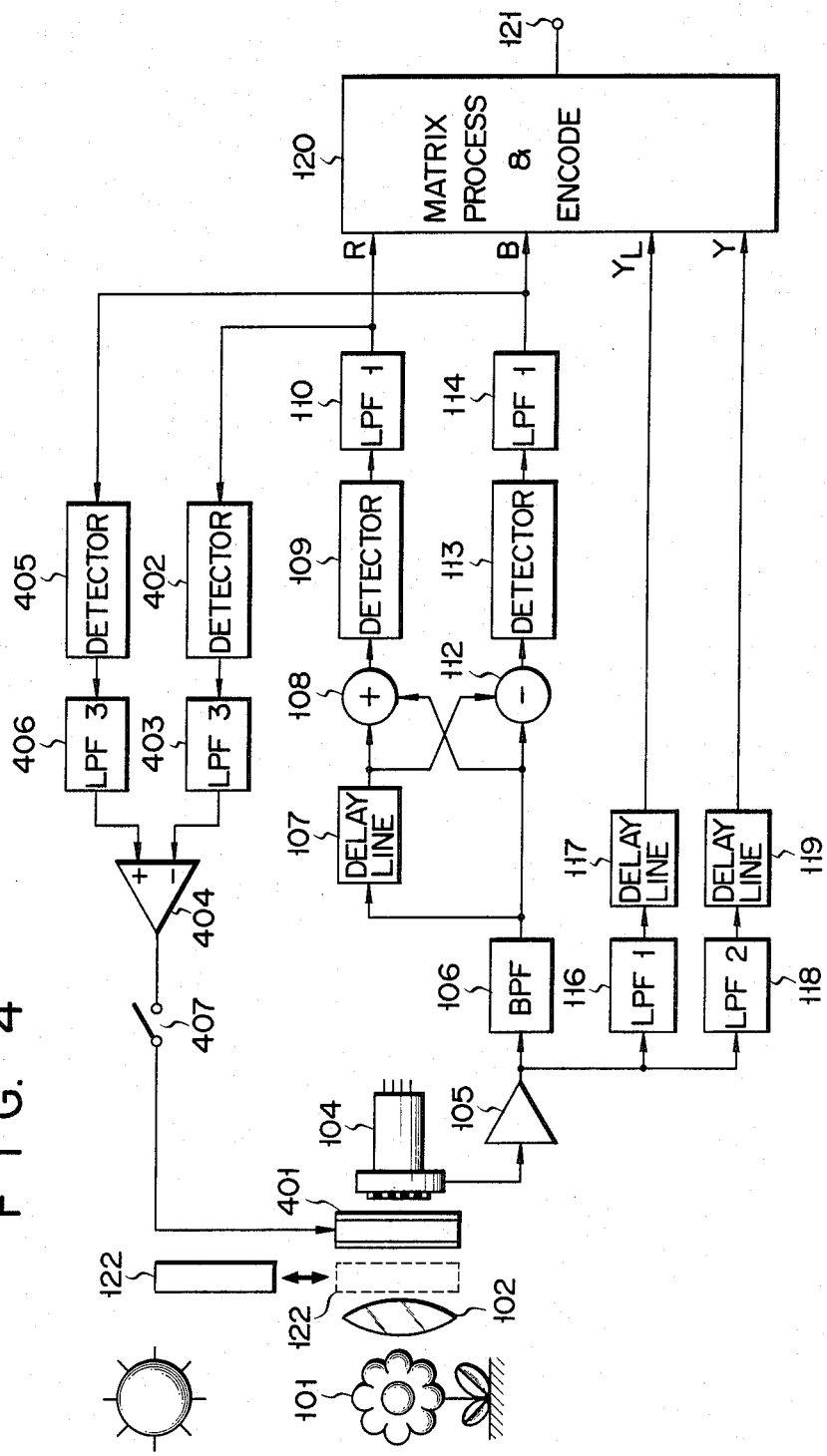
FIG. 4 is a block diagram showing the overall configuration of a color image pickup device according to a first embodiment of the present invention.

FIG. 4 is a block diagram of a color image pickup device according to a first embodiment of the present invention. The same reference numerals used in FIG. 4 denote the same parts in FIG. 1. Referring to FIG. 4, a pickup tube 104 has the stripe filters shown in FIG. 2, but is designed in combination with the stripe filters such that the signals R, B and $Y_L$ can be balanced at a color temperature of 8,000° K. under cloudy weather. Under direct sunlight, light from an outdoor object 101 passes through a lens 102 and an electrochromic element 401 and is incident on the pickup tube 104. According to the same signal processing as described with reference to FIG. 1, signals R, B, $Y_L$ and Y are produced by low-pass filters 110, 114, 116 and 118, respectively.

Figure 6A:
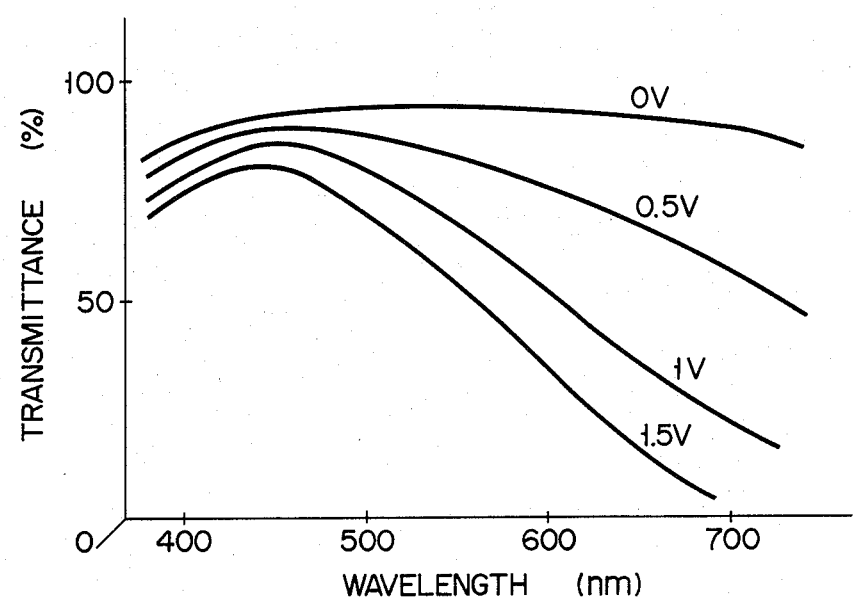
FIG. 6A is a graph for explaining the transmittance as a function of the wavelength of the output signal from the electrochromic element, using a voltage as a parameter.
Figure 6B:
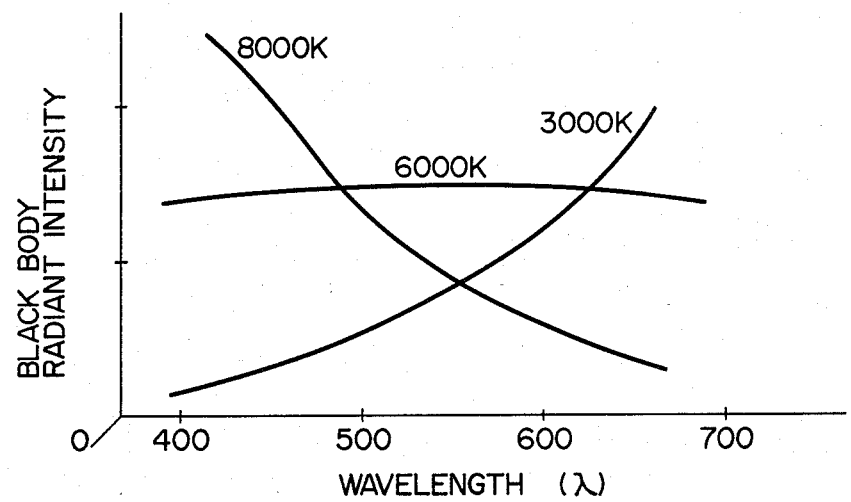
FIG. 6B is a graph for explaining the black body radiant intensity as a function of the wavelength of the output signal, using a color temperature as a parameter.

The electrochromic element 401 will be described in detail. An electrochromic element described in Japanese Patent Disclosure No. 56-4679 can be used as the electrochromic element 401. The electrochromic element 401 is a solid-state optical filter element which changes its spectral transmittance in accordance with a voltage applied thereto and which has the structure shown in FIG. 5. Referring to FIG. 5, a transparent electrode 502 is formed on a glass substrate 506, and a first electrochromic layer 504 of $Ir(OH)_x$, $Ni(OH)_x$ or the like is formed on the transparent electrode 502. A second electrochromic layer 505 of $WO_3$, $MnO_3$ or the like is formed above the first electrochromic layer 504 through an insulating layer 503 which comprises $Ta_2O_5$, $SiO_2$ or the like. A transparent electrode 501 is formed on the second electrochromic layer 505. Since a total thickness of the layers 501 to 505 is as thin as 2 to 3 $\mu$m, the thickness of the electrochromic element is determined by the thickness of the glass substrate 506. When a voltage is applied to the element, the first and second electrochromic layers 504 and 505 simultaneously change their colors, so that the spectral transmittances thereof are changed. FIG. 6A is a graph for explaining the transmittance as a function of the wavelength of the output signal from the electrochromic element, using a voltage as a parameter, and FIG. 6B is a graph for explaining the black body radiant intensity as a function of the wavelength of the output signal, using a color temperature as a parameter. The luminescence of the element is determined by the charge corresponding to a voltage applied from a power source to the transparent electrodes 501 and 502. When a voltage potential between the transparent electrodes 501 and 502 reaches an equilibrium, no current flows therethrough. In this sense, the electrochromic element serves as a capacitor. Even if power supply to the electrochromic element is interrupted, the luminescence continues unless the charge is removed. Therefore, the electrochromic element also serves as a memory element. The memory retention time is substantially determined by the current leakage of the external circuit, but is generally 10 hours. A special memory need not be used for the general purpose. The charge must be removed to extinguish the electrochromic element. For this purpose, a resistor can be connected to the element. In order to increase the extinction speed, a reverse voltage may be applied to the element. In this case, the luminescence and extinction of the element may be delayed when a temperature is decreased. However, the luminescence and extinction response times are as fast as a range between several milliseconds to several tens of milliseconds. In this condition, a diffusion plate 122 is disposed on the optical path. The signals R and B are detected by detectors 402 and 405 and are smoothed by low-pass filters 403 and 406, respectively. The low-pass filters 403 and 406 thus produce DC voltages, respectively. A voltage corresponding to a difference between the DC voltages is produced by a differential amplifier 404. The voltage from the differential amplifier 404 is applied across the electrochromic element 401 through an analog switch 407. In a condition immediately before the white balance control, the electrochromic element 401 stores data corresponding to the previous white-balanced state or to the state when power is supplied to the electrochromic element 401. When the analog switch 407 is turned on, a voltage corresponding to the difference between the signals R and B is applied across the electrochromic element 401, so that its spectral transmittance changes. If a voltage is applied to the electrochromic element 401 such that the electrochromic element 401 emits light when the signal R is greater than the signal B and that it extinguishes when the signal R is smaller than the signal B, the spectral transmittance of the electrospectral element 401 changes until the signal R becomes equal to the signal B. For this purpose, a material of the electrochromic element 401 is selected such that a product of its radiation intensity and a black body radiation intensity is constant within a whole range of color temperature of the visible light rays. In this condition, when the analog switch 407 is turned off, the electrochromic element 401 continues the state described above, so that the optimal white balance is kept. Thereafter, the diffusion plate is removed from the optical path. In this manner, the optimal white balance can be obtained in the whole range of color temperature without using a memory and a movable member. Furthermore, since the balance between the signals can be kept constant, the relationship between the S/N ratios of the signals can be kept constant. The waveform of the signal Y can be kept stable even if the color temperature is changed, thus providing good color reproduction.

As described above, since the color temperature can be converted into color signals by the electrochromic element without using a mechanical means, the video camera as the color image pickup device is substantially free from trouble and has good resistance to vibrations. Further, since a memory need not be used, the video camera becomes compact and light in weight and has a low power consumption. The video camera also provide good color reproduction in a wide range of color temperatures.

Figure 7:
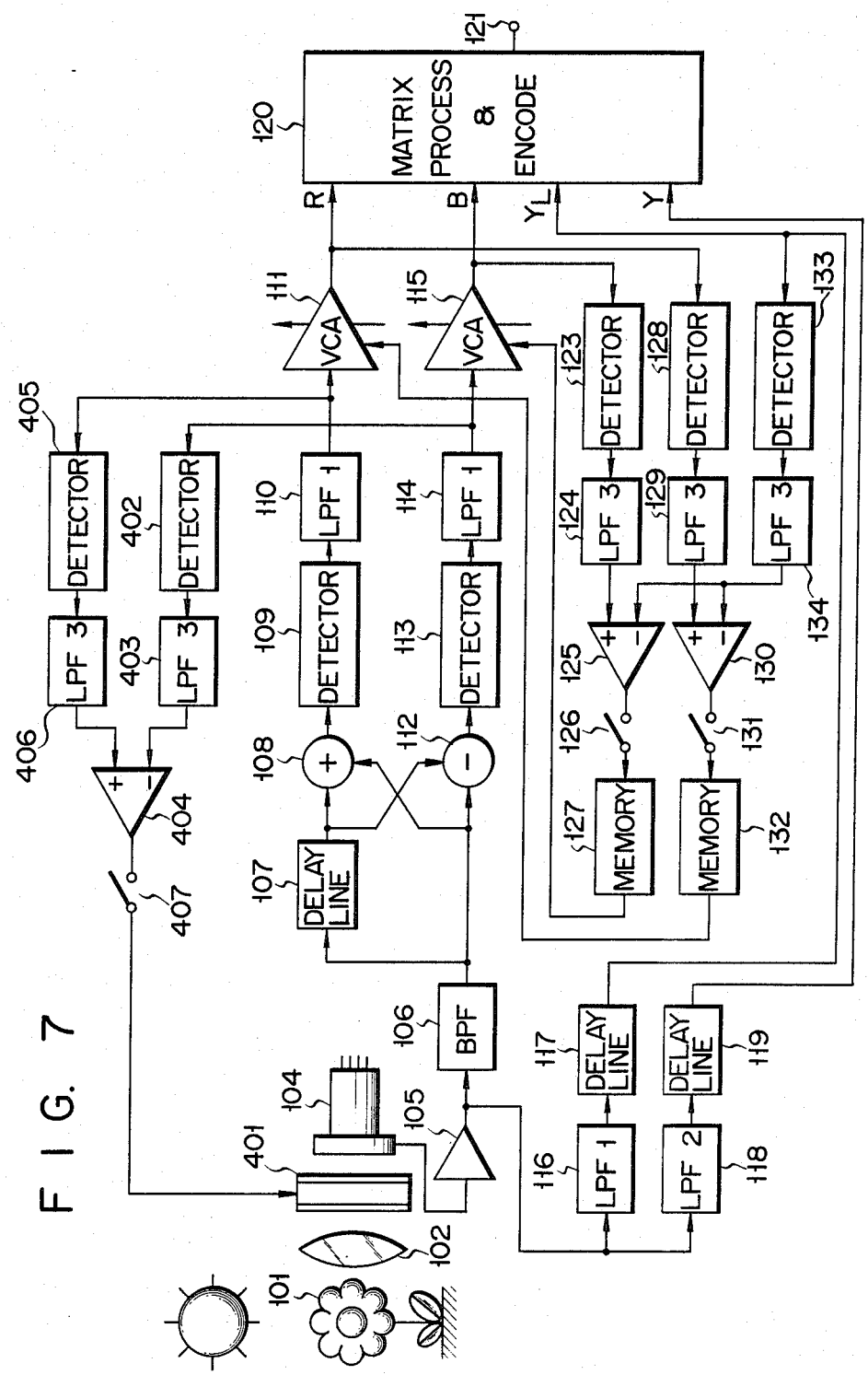
FIG. 7 is a block diagram showing the overall configuration of a color image pickup device according to a second embodiment of the present invention.

FIG. 7 is a block diagram of a color image pickup device according to a second embodiment of the present invention. The device of this embodiment may be used if picture taking must be performed under such an illumination that the good white balance cannot be obtained from the characteristics of the electrochromic element 401 alone. After the red and blue signals R and B are balanced, the remaining error is compensated for by a conventional electrical circuit, thus obtaining a good white balance. Along with the above circuit arrangement, although the circuit elements are increased in number, the S/N ratios of the signals can be improved since the incident light is controlled. Similarly, the signals $Y_L$ and Y are also controlled in the same manner as described, thus obtaining the good color reproduction.

In the above embodiments, the single tube camera of a frequency interleave system is exemplified. However, the present invention is not limited to the above type of image pickup device, but may be extended to any other single tube camera, to a multi-tube camera such as a two-tube camera and a three-tube camera, and to single- and multi-plate cameras using a CCD, a MOS or the like. If the color signal detection in the same manner as in the video camera can be performed, the present invention may be applied to a film camera.

In summary, according to the present invention, the color temperature can be continuously converted into color signals by the image pickup device which has a small number of elements. For this purpose, a movable member need not be used. As a result, a compact, lightweight and strong image pickup device can have low power consumption, a good S/N ratio and good color reproduction characteristics.

What we claim is:

1. A color image pickup device comprising:
   image pickup means for receiving image light from a white object to be photographed or image light integrated by a diffusion plate through an optical path;
   signal separating means for separating two primary color signals from an output video signal from said image pickup means;
   detecting means for comparing the two primary color signals from said signal separating means and for producing a detection signal which indicates a difference between the two primary color signals; and
   an electrochromic element, disposed on the optical path, a spectral transmittance of which is controlled in accordance with the detection signal, whereby said electrochromic element is controlled to obtain an optimal white balance.

2. A device according to claim 1, further comprising a switch interposed between said detecting means and said electrochromic element, and wherein said electrochromic element keeps a controlled spectral transmittance even after said switch is turned off.

3. A device according to claim 1, wherein the two primary color signals comprise a red signal and a blue signal, respectively.

4. A device according to claim 1, wherein the output video signal from said image pickup device is processed such that a luminance signal is separated therefrom, and outputs corresponding to differences between the red signal and the luminance signal and between the blue signal and the luminance signal, respectively, are detected, thereby determining levels of the two primary color signals.

5. A device according to claim 1, wherein said image pickup means comprises a single pickup tube.

6. A device according to claim 1, wherein said image pickup means comprises a solid-state pickup device.

7. A device according to claim 1 wherein the difference between the two primary color signals is detected as a voltage which is then applied across said electrochromic element.

* * * * *